(12) United States Patent
Herron

(10) Patent No.: US 8,965,909 B2
(45) Date of Patent: Feb. 24, 2015

(54) TYPE-AHEAD SEARCH OPTIMIZATION

(71) Applicant: Yahoo! Inc., Sunnyvale, CA (US)

(72) Inventor: Jon Herron, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 76 days.

(21) Appl. No.: 13/726,449

(22) Filed: Dec. 24, 2012

(65) Prior Publication Data

US 2014/0181084 A1 Jun. 26, 2014

(51) Int. Cl.
*G06F 17/00* (2006.01)
*G06F 17/30* (2006.01)

(52) U.S. Cl.
CPC .............................. *G06F 17/30477* (2013.01)
USPC ........... 707/754; 707/713; 707/722; 707/736; 706/12; 706/14

(58) Field of Classification Search
None
See application file for complete search history.

(56) References Cited

U.S. PATENT DOCUMENTS

| | | | |
|---|---|---|---|
| 7,779,011 B2 * | 8/2010 | Venkataraman et al. | 707/742 |
| 7,991,780 B1 * | 8/2011 | Anderson et al. | 707/754 |
| 8,135,729 B2 * | 3/2012 | Brewer et al. | 707/767 |
| 8,498,983 B1 * | 7/2013 | Zhang | 707/731 |
| 8,655,905 B2 * | 2/2014 | Brewer et al. | 707/767 |
| 2007/0050351 A1 * | 3/2007 | Kasperski et al. | 707/4 |
| 2010/0153885 A1 * | 6/2010 | Yates | 715/841 |
| 2010/0161661 A1 * | 6/2010 | Hood et al. | 707/770 |
| 2011/0270874 A1 * | 11/2011 | Aley | 707/769 |
| 2012/0084311 A1 * | 4/2012 | Kawauchi | 707/766 |
| 2012/0310922 A1 * | 12/2012 | Johnson et al. | 707/722 |
| 2013/0018880 A1 * | 1/2013 | Venkataraman et al. | 707/728 |
| 2014/0006409 A1 * | 1/2014 | Prosnitz et al. | 707/740 |
| 2014/0122516 A1 * | 5/2014 | Brewer et al. | 707/767 |
| 2014/0143268 A1 * | 5/2014 | Finkelstein et al. | 707/767 |

* cited by examiner

*Primary Examiner* — Hung Le
(74) *Attorney, Agent, or Firm* — Hickman Palermo Truong Becker et al LLP; Daniel D. Ledesma

(57) ABSTRACT

Techniques are provided for efficiently performing a series of searches. After an initial set of search results is determined from a data set based on a search query, one or more additional characters are added to the search query. In response, another search is performed, using the updated search query, but the new search is limited to searching the initial set of search results. Thus, the original data set is not accessed or searched again. This is possible due to the nature of the data. Each subsequent search is based on one or more characters that were added to a previous search query. Thus, each subsequent search is constrained to the search results that were identified in a previous search.

16 Claims, 13 Drawing Sheets

TYPE-AHEAD SEARCH OPTIMIZATION

FIELD OF THE INVENTION

The present invention relates to searching and, more particularly, to performing searches in an efficient manner as additional input is received.

BACKGROUND

Mobile devices, such as smartphones, have become ubiquitous as their prices lowered and their processing capabilities increased, due to faster CPUs, smaller memory components that can hold more data, increased network bandwidth and capabilities, and portability. Thus, users now access their smartphones more frequently now relative to their desktop or laptop computers, which tend to be more cumbersome to carry around.

Due to Internet connectivity and portability of handheld devices, users perform many tasks that were previously performed on desktop devices. Such tasks include Internet browsing and emailing. For example, in composing an email, a user needs to specify an email address as the destination of the email. To assist the user in quickly specifying the email address, a mobile email application performs a search of the user's contacts that are stored on the user's mobile device based on one or more characters specified so far. Each time the user enters another character, a new search is performed. Each updated search may be a database search or an index search that requires one or more indexes to be created based on the contact information. However, such an approach is resource intensive since each search is resource intensive. Despite their increased computing power, handheld devices are still considered resource-constrained devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
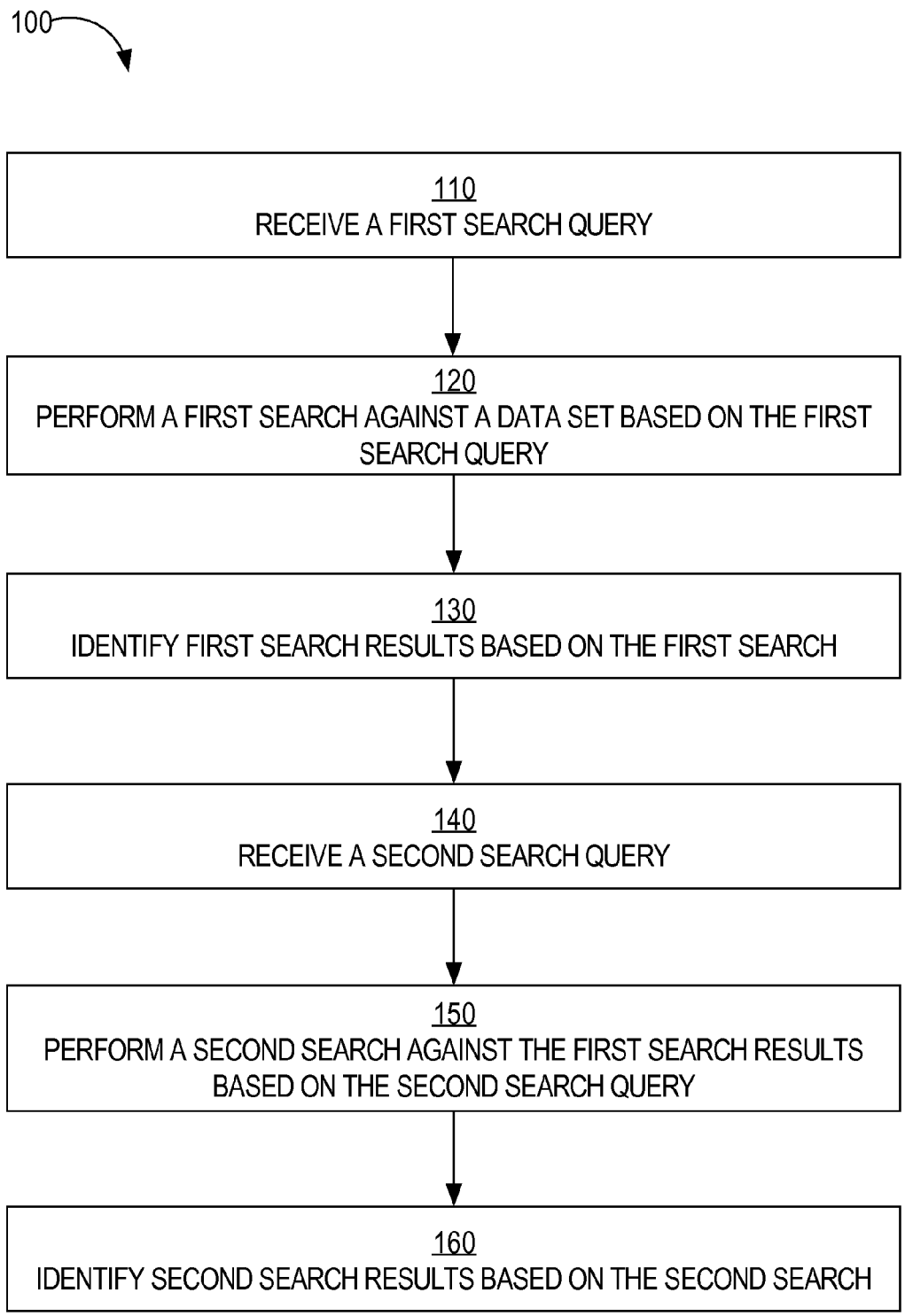
FIG. 1 is a flow diagram that depicts a general process for performing a series of searches, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficiently identifying search results once a set of search results is already known. In one approach, a search is performed based on an initial search query to identify a set of search results. The set of search results may represent all possible results based on the initial search query. Any additional character that the user adds to the initial search query will cause a new search to be performed, but only against the initial search results. Any search results that are based on one or more additional characters must be a subset of the initial search results. Thus, any subsequent searches are performed against the initial search results or a subset thereof.

In one approach, after an initial search is performed based on an initial search query, a set of references or pointers is created and "pushed onto" a stack. Each reference in the set references or points to a memory location where a result data item that satisfies the initial search query is located. In this way, data from searchable items is not copied. Then, after a second search is performed against the result data items that satisfy the initial search query, a second set of references is created and pushed onto the stack. Each reference in the second set references or points to a memory location where a result item is located, the result item being a searchable item that satisfies the current search query.

Client Device

Although the following examples involve a mobile device, such as a smartphone, embodiments are applicable to any type of client device. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Example of a General Search Process

FIG. 1 is a flow diagram that depicts a process 100 for performing a series of searches, in an embodiment. At block 110, a first search query is received. The first search query may include one or more characters. Embodiments are not limited to how the characters are encoded. For example, the characters may be encoded using the ASCII encoding scheme or a Unicode encoding scheme, such as UTF-8.

At block 120, a first search is performed against a data set based on the first search query. Thus, data items in the data set are analyzed to determine whether the data items satisfy the first search query. "Satisfying" a search query is not limited to any particular mean of the term "satisfying." A data item "satisfies" the first search query if, for example, the data item includes a word, term, phrase, or sequence of characters whose prefix is the same as the first search query. For example, if a data item includes "alan" and a search query is "al", then the data item satisfies "al." However, if the data includes "alan" and a search query is "la", then the data item does not necessarily satisfy "la" (unless another word or term in the data item starts with "la."

Additionally or alternatively, a data item "satisfies" the first search if the data item includes a word, term, phrase, or sequence of characters that includes the first search query. For example, if a data item includes "alan" and a search query is "la", then the data item satisfies "la." As another example, if a data item includes "555-444-3333" and a search query is "43", then the data item satisfies "43" (assuming that the hyphen ("-") is ignored for purposes of comparison).

At block 130, first search results are identified based on first search. In other words, data items, in the data set, that satisfy the first search query are identified.

At block 140, a second search query is received. The first search query may be subset of the second search query. Thus, the second search query may consist of the first search query with one or more characters appended to the end of the first search query. For example, the first search query may be "a" and the second search query may be "al."

Specifically, block 140 may involve receiving one or more characters (from a user interface (UI) component, for example) and appending the one or more characters to the first (previous) search query to create the second (current) search query.

At block 150, a second search is performed against the first search results based on the second search query. Thus, each search result in the first search results is analyzed to determine whether the search result satisfies the second search query.

At block 160, second search results are identified based on the second search. In other words, data items in the first search results that satisfy the second search query are identified.

Process 100 may return to block 140 as a user enters additional input that represents one or more characters. In that case, block 140 would involve receiving a third search query, block 150 would involve performing a third search against the second search results using the third search query, and block 160 would involve identifying third search results based on the third search query.

Example of a Specific Search Process

Figure 2A:
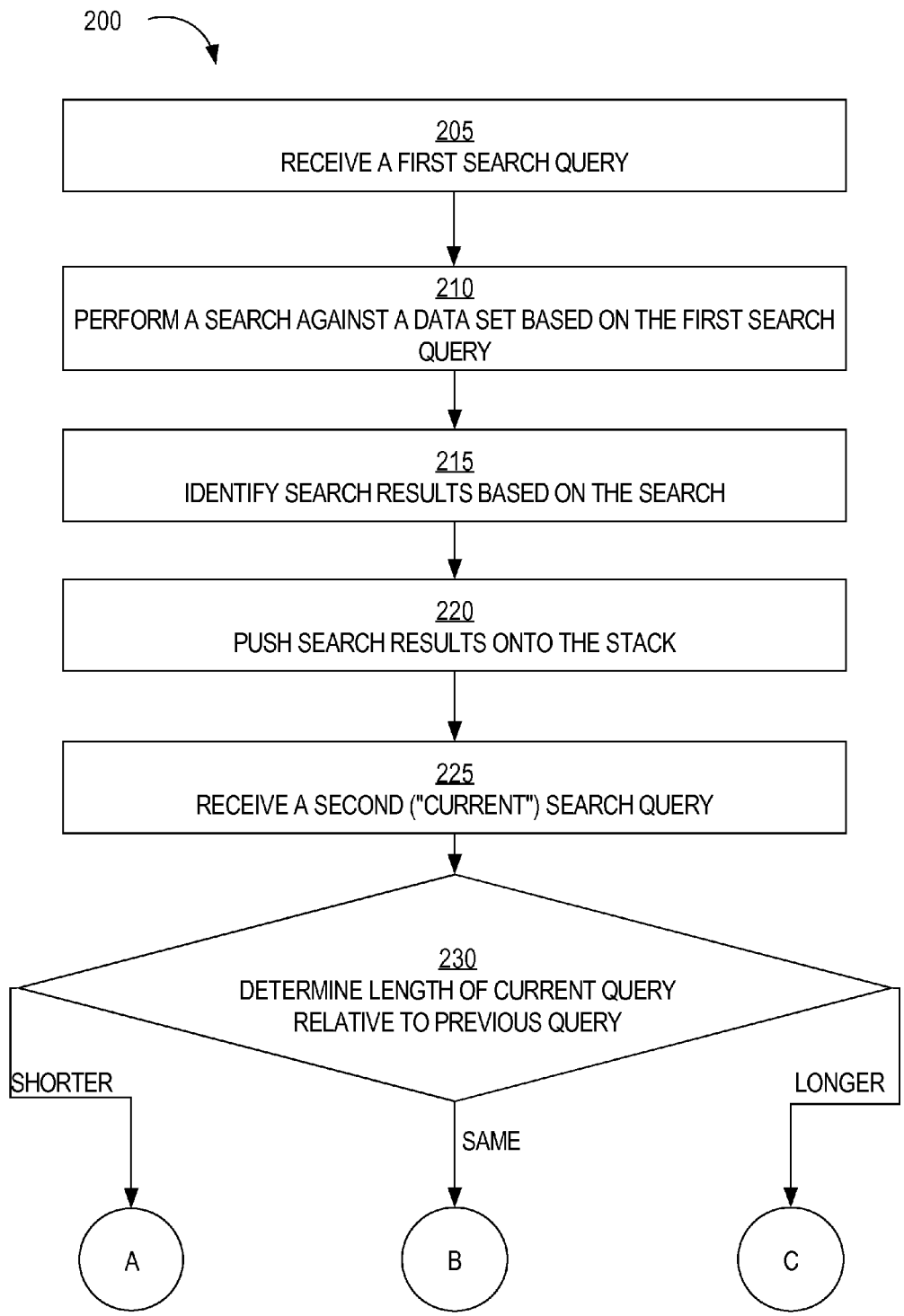
FIG. 2A-2C are flow diagrams that depict a specific process for performing a series of searches, in an embodiment.
Figure 2B:
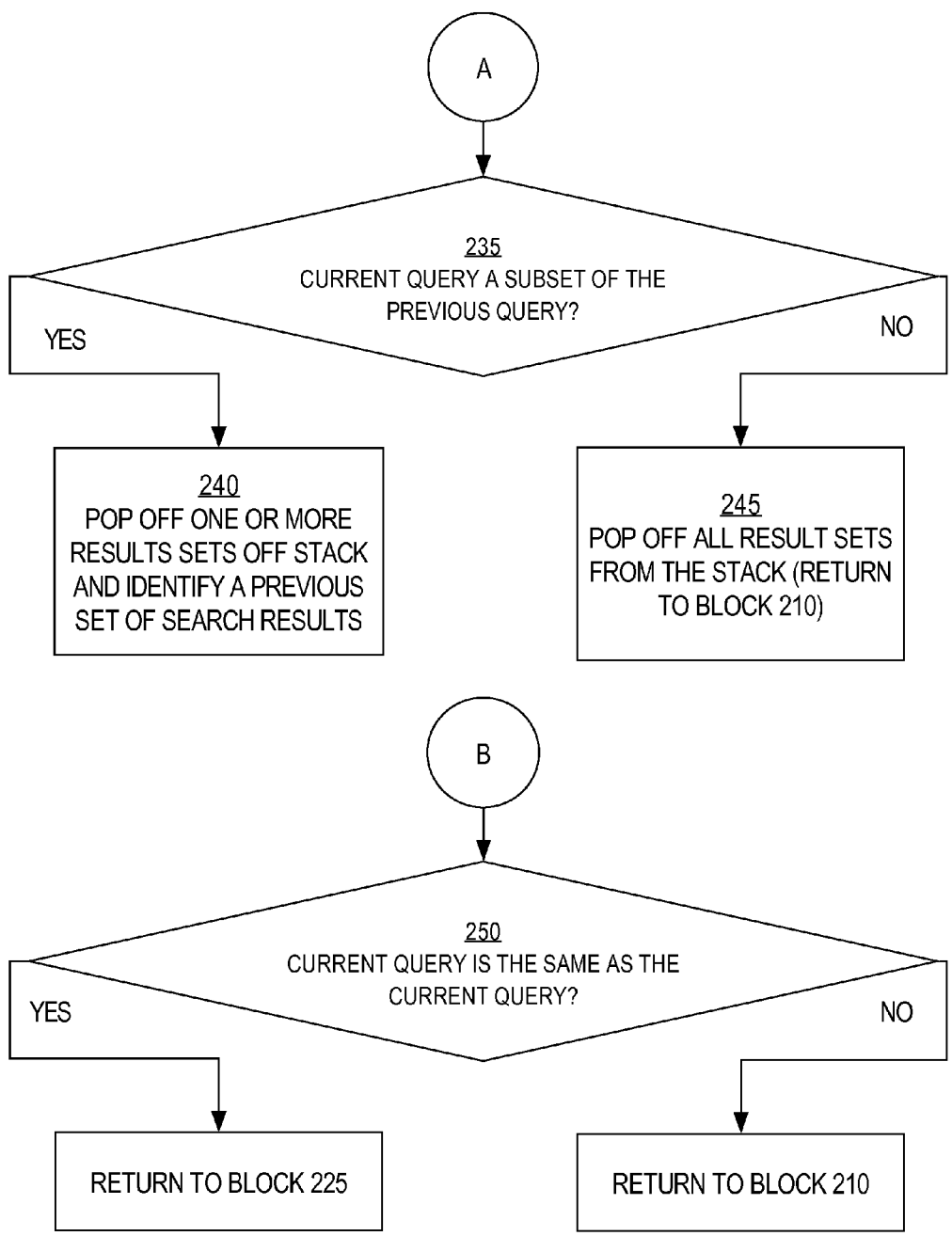
Figure 2C:
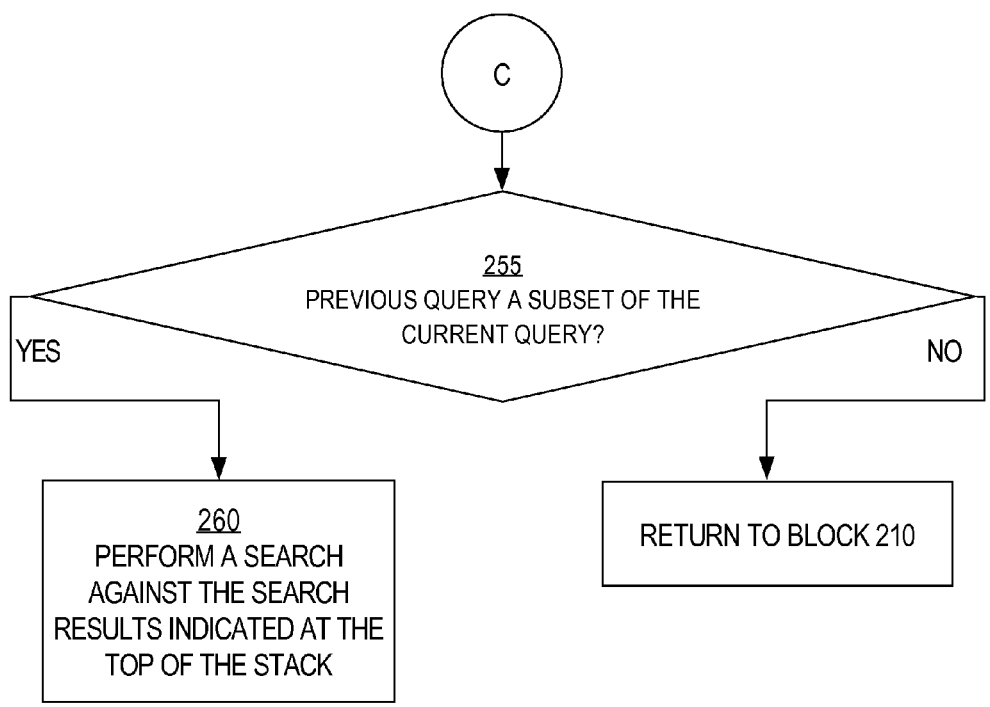

FIGS. 2A-2C are flow diagrams that depict a process 200 for performing a series of searches, in an embodiment. Like process 100, process 200 may be implemented in hardware, software, or any combination of hardware and software. Examples of software that may implement process 200 include (a) a mobile application (i.e., executing on a mobile device) and (b) a software component that communicates with a separate (e.g., mobile) application to provide search functionality to the application. Additionally, process 200 may be implemented by multiple software processes.

At block 205, a first search query is received. For example, a mobile application receives (e.g., voice or text) input from a user, translates the input into text data (referred to as the "first search query"), and sends the initial search query to search component. The first search query may be single character or multiple characters. For example, the user may have typed "s" into a search field. As another example, the user may have initiated a paste operation that pasted "stan" into the search field. As another example, the user may have uttered "smith" and a voice translation component built into the mobile application (or the search component) translates the voice data into "smith."

At block 210, a first search is performed against a data set using the first search query. Data items that satisfy the first search query is identified and returned. Embodiments of the invention are not limited to how the data set is organized in persistent storage or in memory. The data items may be organized as, for example, objects or relational data. The data set may be stored in non-volatile memory (e.g., hard disk, flash memory) or in volatile memory, such as RAM.

In one example, the data set is a contacts database, where each data item in the data set corresponds to a different contact. Such a data item (or data record) may contain a fields for first name, last name, home address, business address, one or more email addresses, work number, home phone number, mobile phone number, job title, etc. Multiple data items may contain duplicate information. For example, multiple data items may be stored for a person named "Paul Smith." One of the data items may contain Paul Smith's home address, while other of the data items may contain Paul Smith's mobile number.

Another example of a data set is a listing of applications on a user's mobile device. The user may search for a certain application by typing a portion of the application's name or description without having to browse through multiple user interface (UI) windows or pages to locate the application.

In an embodiment, the data set is read into memory prior to execution of process 200 or in response to block 205 (i.e., receiving the first search query). For example, in an email application, a contacts database that is stored in non-volatile memory is read into volatile memory in response to a user initiating an instruction to the email application to create a new message. Such initiating may involve the user selecting a compose button. As another example, the contact database may be read into volatile memory in response to the user selecting a "Contacts" button that indicates that the user desires to search his/her contacts.

In an alternative embodiment, the data set is searched while the data set is stored in non-volatile memory without first reading the entire data set into volatile memory. The data items that satisfy the first search query are then read from non-volatile memory and stored in volatile memory.

The first search may involve querying the data set directly (whether or not the data set is stored in volatile or non-volatile memory). Alternatively, the first search may leverage one or more indexes that are generated based on the data set. The one or more indexes may or may not contain references to data items in the data set.

At block 215, data items that satisfy the first search are identified. These data items are referred to as the "initial search results." The initial search results may be ordered based on one or more criteria. For example, the initial search results may be ordered alphabetically. As another example, each of the initial search results may have a ranking and the order is based on the ranking. The ranking may take into account multiple factors, such as most recently-changed data item, most recently-accessed data item, most accessed data item over a certain period of time, or context information, such as the most recently-received email or text message and what is currently being displayed on the user's mobile device.

Block 215 may also involve causing the initial search results (or a portion thereof) to be displayed. For example, a search component, after identifying the initial search results, provides a copy of the initial search results to a mobile application that sent the search component the first search query. If the initial search results will not all fit onto the user's (e.g., smartphone) screen, then the mobile application may determine to display only the top N of the initial search results. Displaying the initial search results may occur prior to block 220 or after block 220.

At block 220, the initial search results are placed (or "pushed") onto a stack. A "stack" is a last-in-first-out queue where the most recent items that are pushed onto the stack are the first items taken (or "popped") off of the stack.

In an embodiment, pushing the initial search results onto the stack involves creating a copy of the initial search results and pushing the copy onto the stack. Thus, for example, volatile memory may contain the entire contacts database and a copy of the contact records that satisfy the first search query.

In an alternative embodiment, pushing the initial search results onto the stack involves creating references that reference or point to the data items (in volatile memory) that satisfy the first search query. For example, each reference may identify a memory location where the corresponding data item is stored.

The set of references that are created may be stored in an array or vector that is part of a data structure (e.g., an object). In an embodiment, in addition to containing a reference array, the data structure also contains a copy of the first search query (e.g., "s"). This may be used later when determining whether to "pop off" (or remove) a set of search results from the stack.

At block 225, a second search query is received. Because process 200 accounts for repeats in some of the blocks of process 200, the second search query is referred to now on as the "current search query" and the first search query is referred to now on as the "previous search query."

At block 230, it is determined whether the current search query is longer than, shorter than, or the same as the previous search query. For example, the previous search query may be "sm" while the current search query may be "smi." Alternatively, the previous search query may be "robert" while the current search query may be "rob." If the current search query is shorter than or the same as the previous search query, then either (a) one or more characters were deleted from the previous search query or (b) the user pasted in a different set of one or more characters into the search field to replace the previous search query. If the current search query is shorter than the previous search query, then process 200 proceeds to block 235. If the current search query is the same as the previous search query, then process 200 proceeds to block 250. If the current search query is longer than the previous search query, then process 200 proceeds to block 255.

At block 235 (where the current search query is shorter than the previous search query), it is determined whether the current search query is a subset of the previous search query. For example, "s" is a subset of "sm." If so, then process 200 proceeds to block 240. Otherwise, process 200 proceeds to block 245. As an example of this scenario, the current search query may be "a" while the previous search query may be "sm."

At block 240, one or more sets of search results are "popped off" (or removed from) the stack. The "new" top set of search results correspond to a previous set of search results. That previous set of search results (or a portion thereof) may be displayed. In this manner, a new search of the original data set (or of one or more indexes that are generated based on the original data set) is avoided. The previous set of search results is immediately available. The new top set of search results may be copies of data items that satisfy a previous search query or may be references (or pointers) to those data items. Process 200 halts and waits for additional input, if any. If a subsequent search query is received, then process 200 returns to block 225.

At block 245, all the search results are "popped off" (or removed) from the stack. None of the search results that have been determined thus far is applicable to the current search query. In the example above where the current search query is "a" and the previous search query is "sm," any search results that satisfy "sm" will not satisfy "a." Process 200 returns to block 210 where a new search is performed.

At block 250 (where the current search query is the same length as the previous search query), it is determined whether the current search query is the same as the previous search query. If the current search query is the same as the previous search query, then process 200 halts and waits for additional input, if any. If a subsequent search query is received, then process 200 returns to block 225.

If the current search query is not the same as the previous search query, then process 200 returns to block 210 where a new search is performed on the new search query. In this scenario, the user must have provided input that overrides the previous search query. For example, the user may have pasted "an" into the search field to replace the previous search query "sm."

At block 255 (where the current search query is longer than the previous search query), it is determined whether the previous search query is a subset of the current search query. If not, then process 200 returns to block 210, where a new search is performed and whatever is on the stack is popped off. An example of this scenario is if the previous search query is "sm" and the current search query is "rob." This scenario might happen if the user initiates a paste operation that replaces the text in the search field with a new set of text.

If the previous search query is a subset of the current search query, then process 200 proceeds to block 260.

At block 260, a search is performed against the search result(s) that are indicated at the top of the stack to determine whether the search result(s) satisfy the current search query. The search is not performed against data items that are part of the most recent search result(s). For example, if the initial search was against a contacts database, this search of block 260 is not performed against the contacts database. In many cases, the search results from block 260 will be a strict (or proper) subset of the search results indicated at the top of the stack.

If the most recent search result(s) indicated at the top of the stack are copies of data items, then determining whether the most recent search result(s) satisfy the current search query is performed against those copies. If the most recent search result(s) are reflected in a set of references at the top of the stack, then each of those references is used to identify a corresponding data item (e.g., that is stored in volatile memory). Each of the corresponding data items is then analyzed to determine whether the data item satisfies the current search query.

Block 260 may further involve displaying the search results that are identified based on the search.

After block 260, process 200 halts and waits for additional input, if any. If a subsequent search query is received, then process 200 returns to block 225.

Memory Example

Figure 3A:
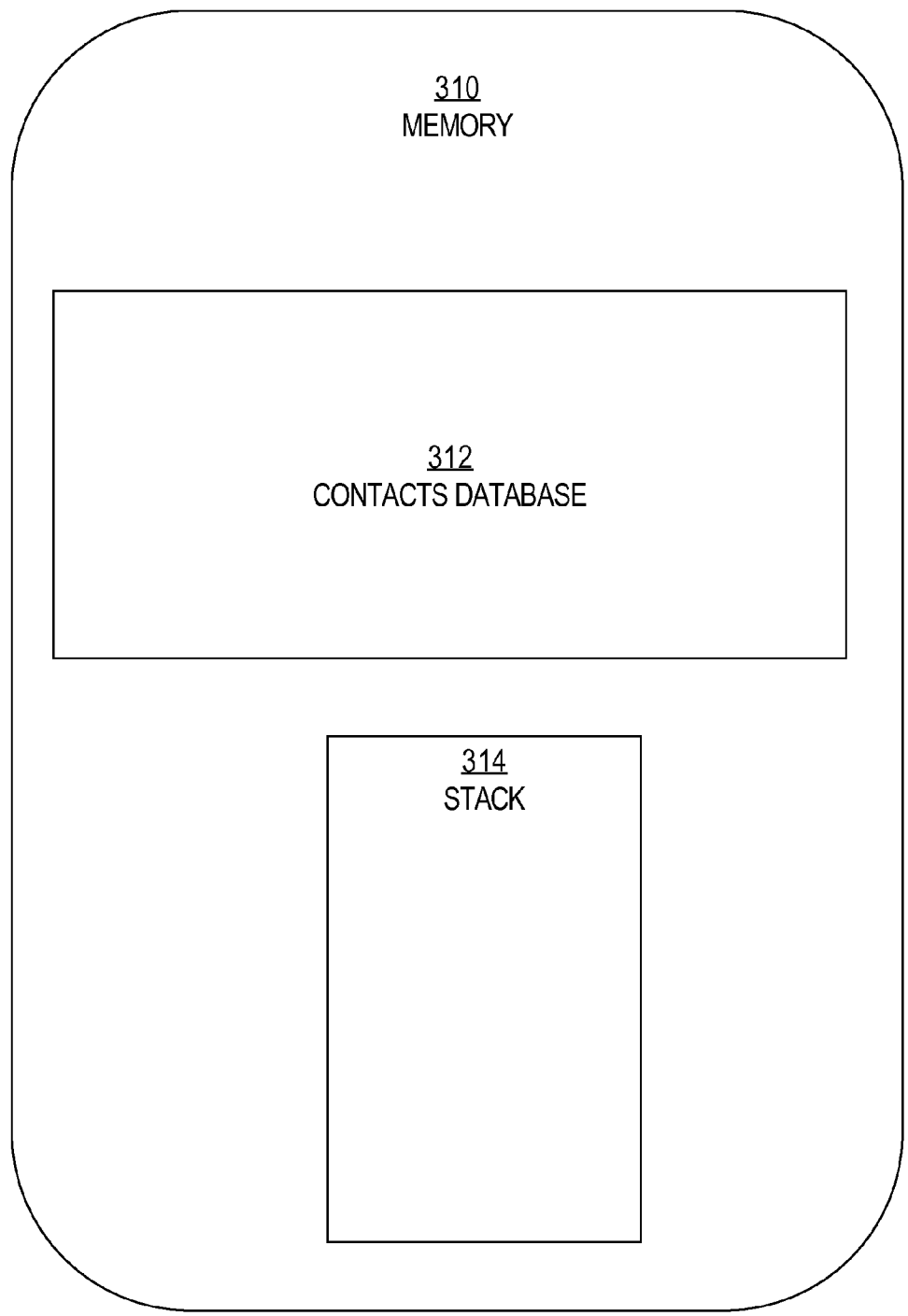
FIGS. 3A-3H are block diagrams that depict a stack as the stack changes in response to multiple inputs from a user, in an embodiment.

FIGS. 3A-3H are block diagrams that depict a stack as the stack changes in response to multiple inputs from a user, in an embodiment. Each of FIGS. 3A-3H depict memory 310 (which may be volatile memory), a contacts database 312 (which may have been read into memory 310 from other memory or storage device (not shown)), and a stack 314. In FIG. 3A, stack 314 is empty because no search query has yet been processed.

A contacts database is one example of a data source that may be the target of a series of searches. Another type of data source may be a calendar database where one or more searches are performed against calendar items that have been created for a user (or multiple users). Search criteria that are relevant for searching calendar items include date, time, location, attendees, organizer, etc. Embodiments are not limited to any particular type of data source.

Figure 3B:
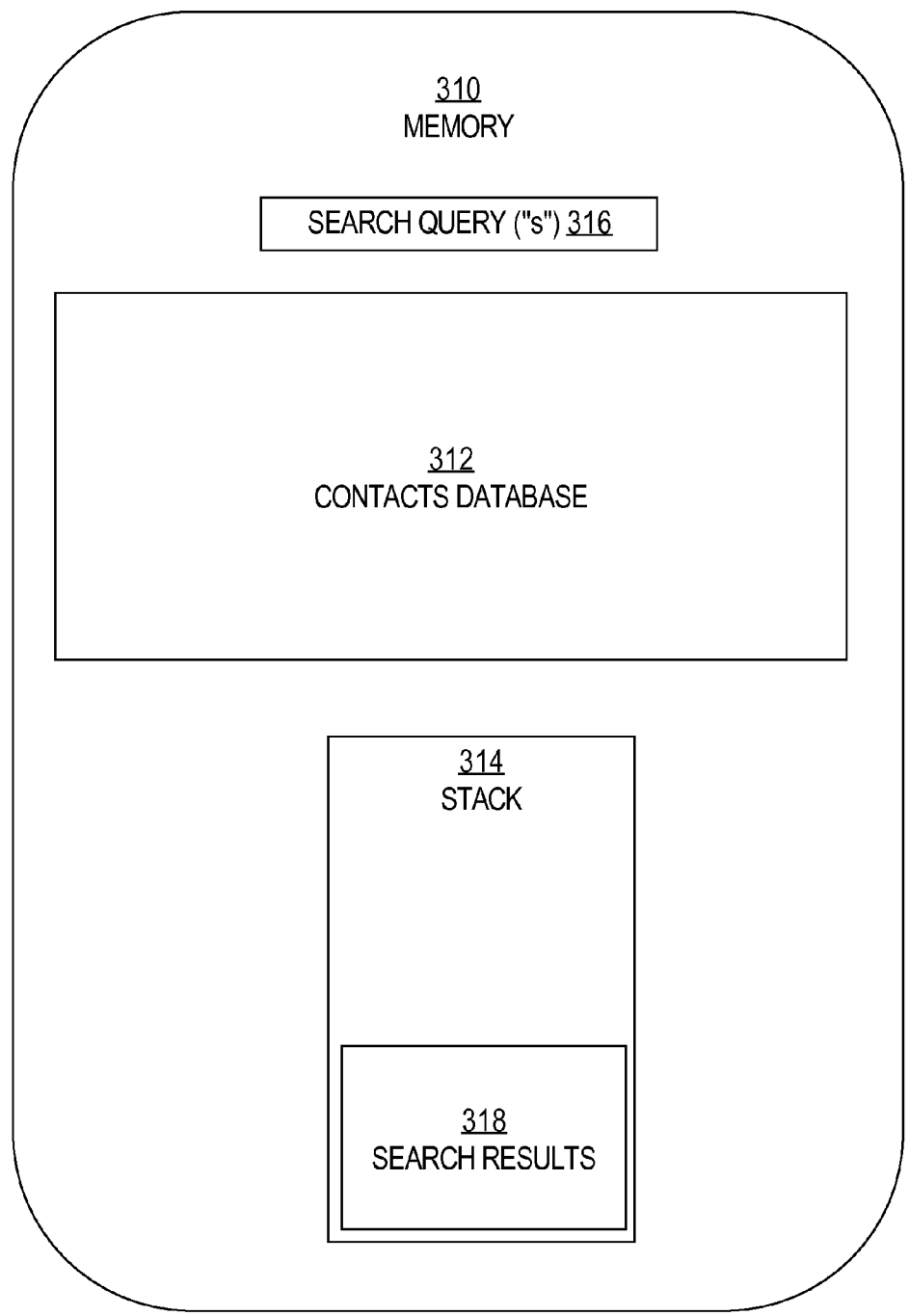

FIG. 3B additionally includes a search query 316. In this example, the search query is "s." In response to receiving "s" as the search query, a search component (not shown) performs a search against contacts database 312. In response to identifying data items in contacts database 312 that satisfy "s," the search component creates search results 318 and pushes search results 318 onto stack 314.

As noted previously, search results 318 may include a set of references (or pointers), where each reference is used to identify a data item in contacts database 312. Alternatively, search results 318 may include copy of the data items that satisfy search query 316. In either scenario, search results 318 may also include the search term(s) of the search query that were used to identify the data items. In this example, the search term is "s"; thus, search results 318 may include "s" as the search query that was used to identify data items that are indicated in search results 318.

Figure 3C:
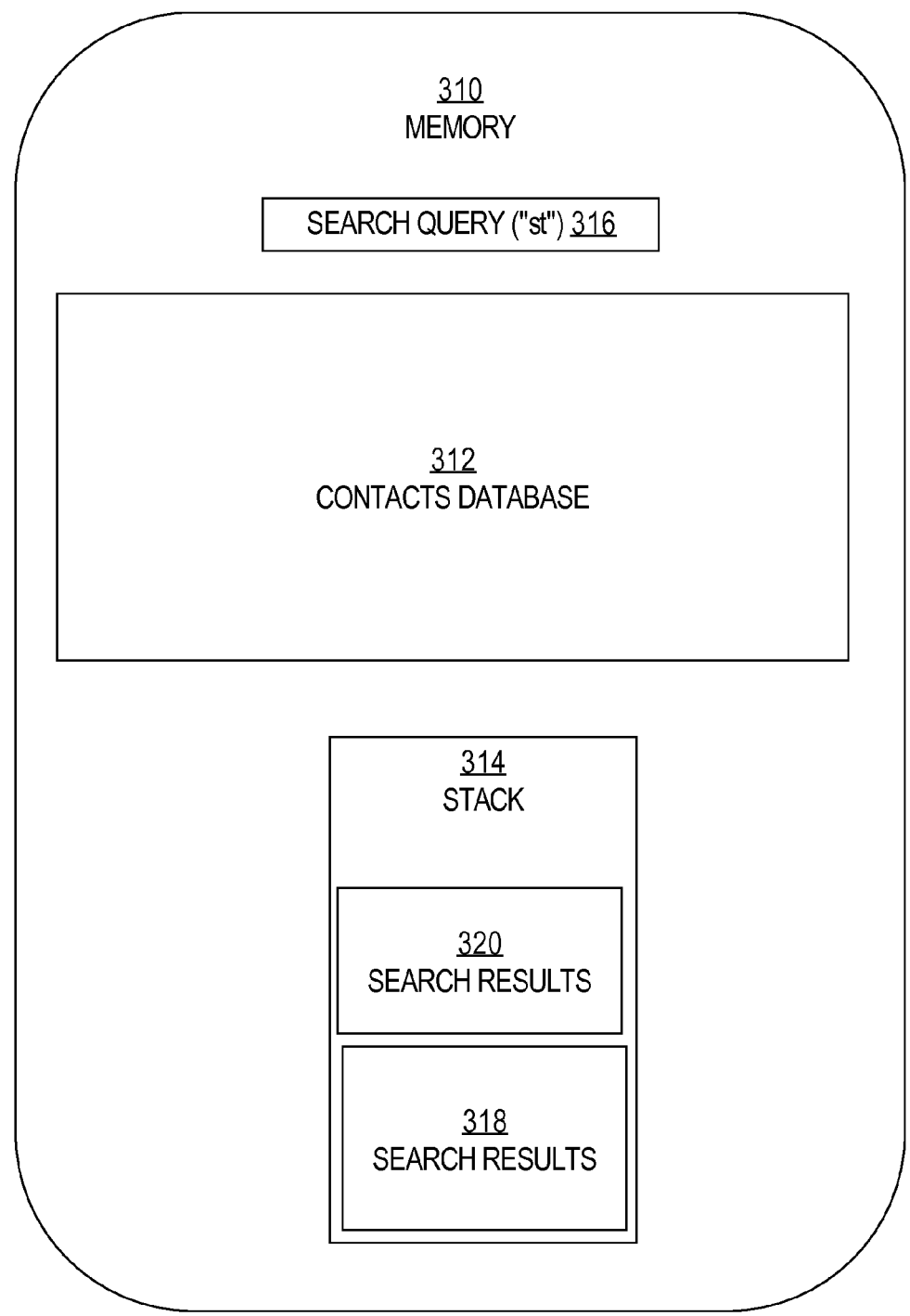

FIG. 3C indicates that search query 316 is now "st." In response to receiving "st" as the search query, the search component (not shown) performs a search against the data items indicated by search results 318. The search component, in response to each search query, may first determine whether stack 314 is empty and, if so, search contacts database 312 (or whatever other data source is the target of the search). In this scenario, stack 314 is not empty; thus, the search component identifies search results 318 (because it is "on the top" of stack 314) and performs a search against data items indicated in search results 318. If search results 318 includes copies of the data items that satisfied the previous search (i.e., "s" in this example), then the search is performed on those copies. If search results 318 include references (or pointers) to data items in contacts database 312, then the search component uses the references to identify the data items in contacts database 312 and determines whether those data items satisfy search query 316, which is currently "st." In response to identifying data items in contacts database 312 that satisfy "st," the search component creates search results 320 and pushes search results 320 onto stack 314, as depicted in FIG. 3C. The data items indicated by search results 320 are a subset of the data items indicated by search results 318.

Figure 3D:
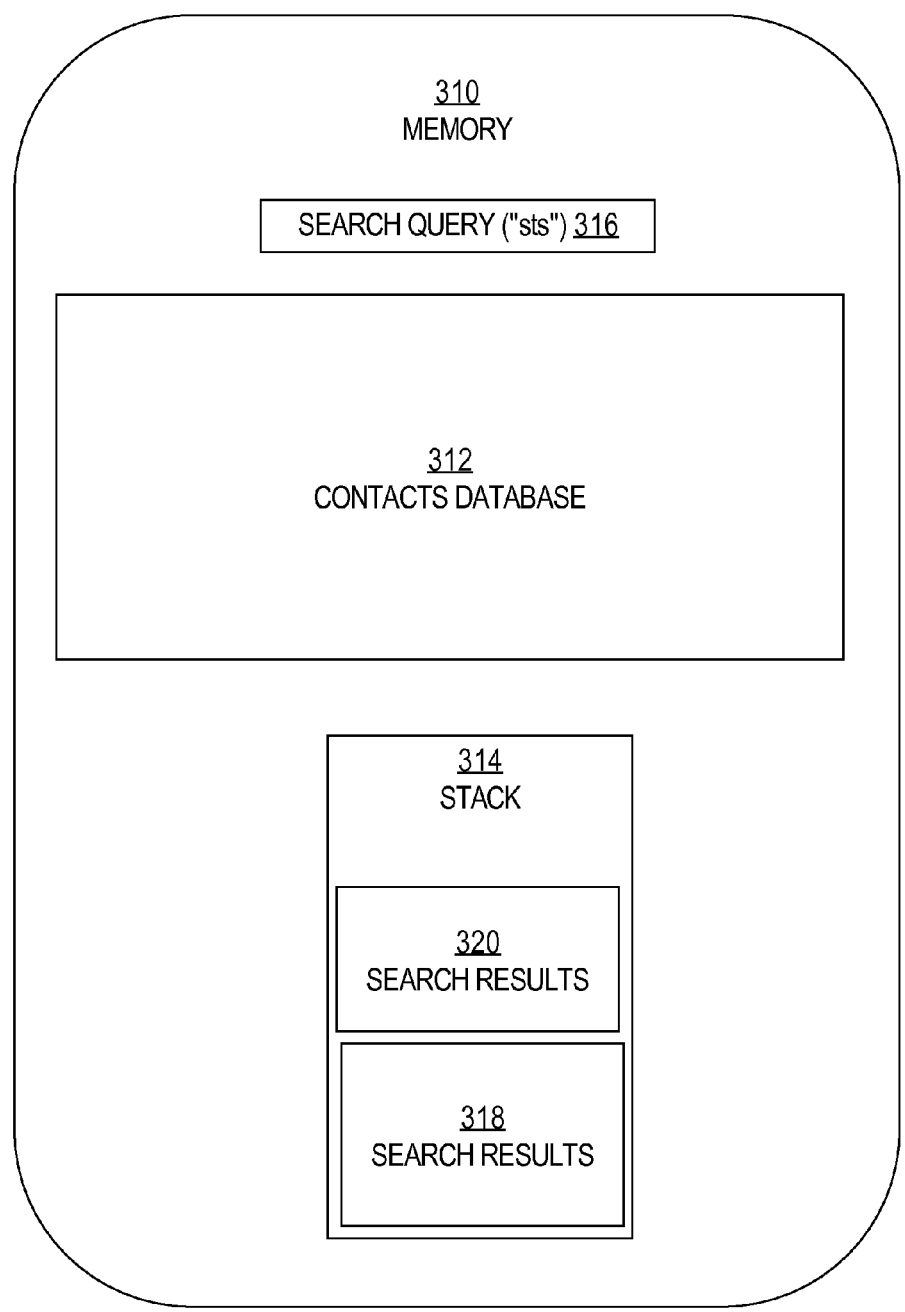

FIG. 3D indicates that search query 316 is now "sts." In response to determining that search query 316 is "sts," the search component (not shown) performs a search against the data items indicated by search results 320. In this example, no data items in contacts database 312 (or in search results 320 if search results 320 contain copies of data items) satisfy "sts." As a result, no search results are identified. A screen of the user's device may be updated to reflect that no search results satisfy the current search query.

Figure 3E:
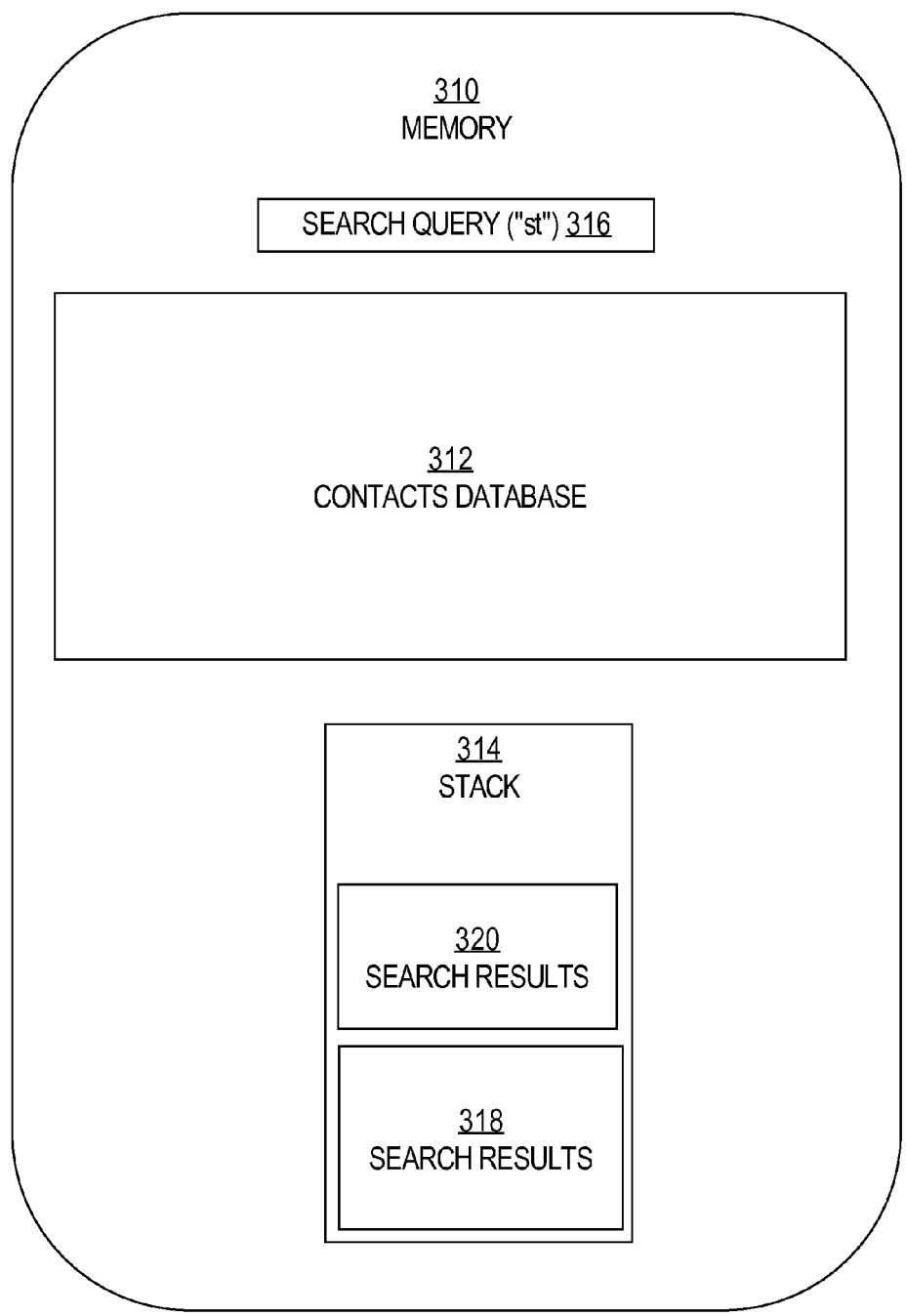

FIG. 3E indicates that search query 316 is now "st." In response, the search component may examine search results 320 and determine that "st" matches the search query that was used to identify the data items indicated by search results 320. The search component may then cause those data items to be displayed to the user.

Figure 3F:
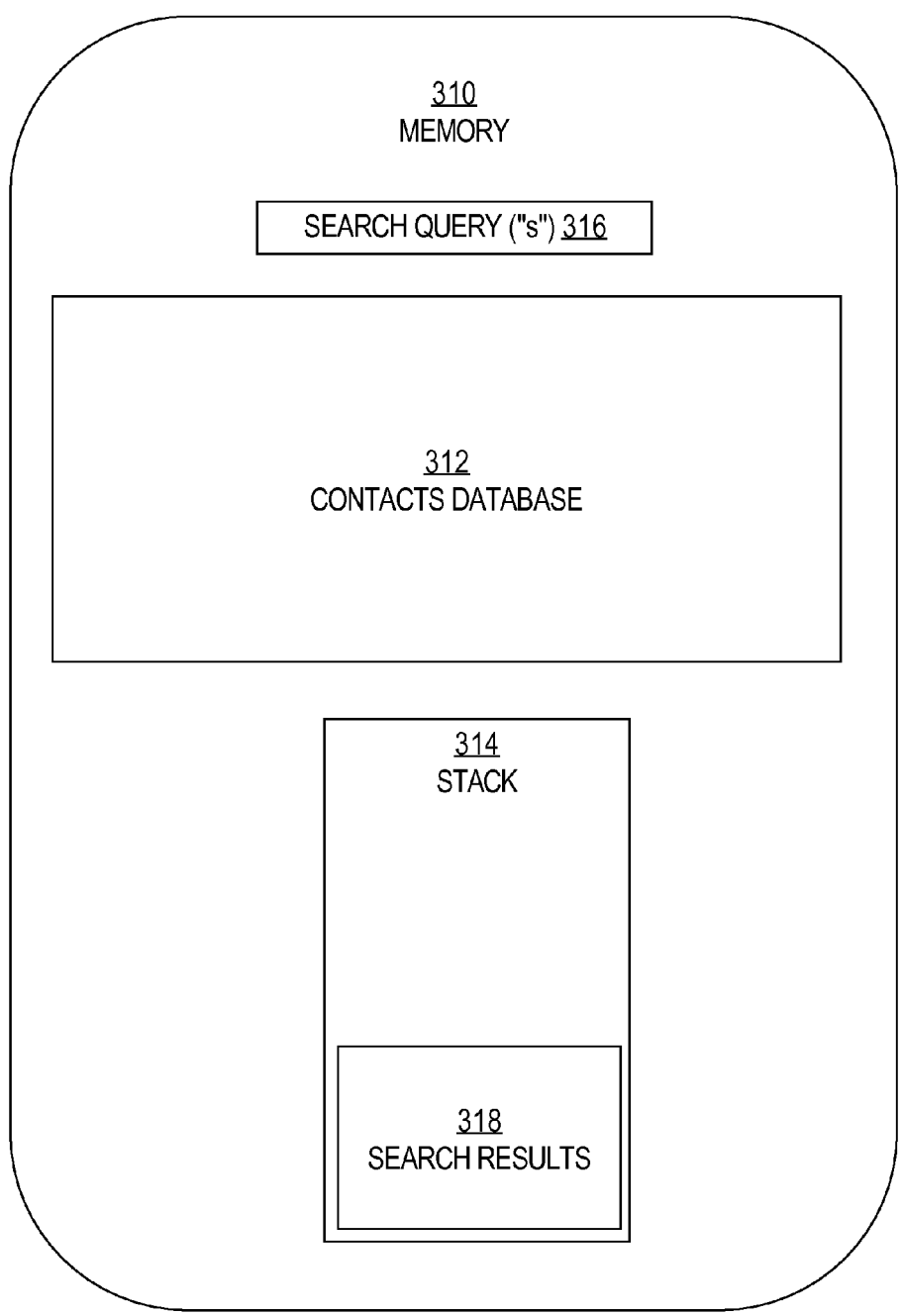

FIG. 3F indicates that search query 316 is now "s." In response, the search component may determine that search query 316 is shorter than the previous version of search query 316 and, as a result, pop off the top set of search results from stack 314. In this example, the top set of search results is search results 320. The search component may then determine that search query 316 matches the search term(s) that were used to identify the data items indicated in the current "top" set of search results in stack 314. In this example, the current top set of search results is search results 318.

Figure 3G:
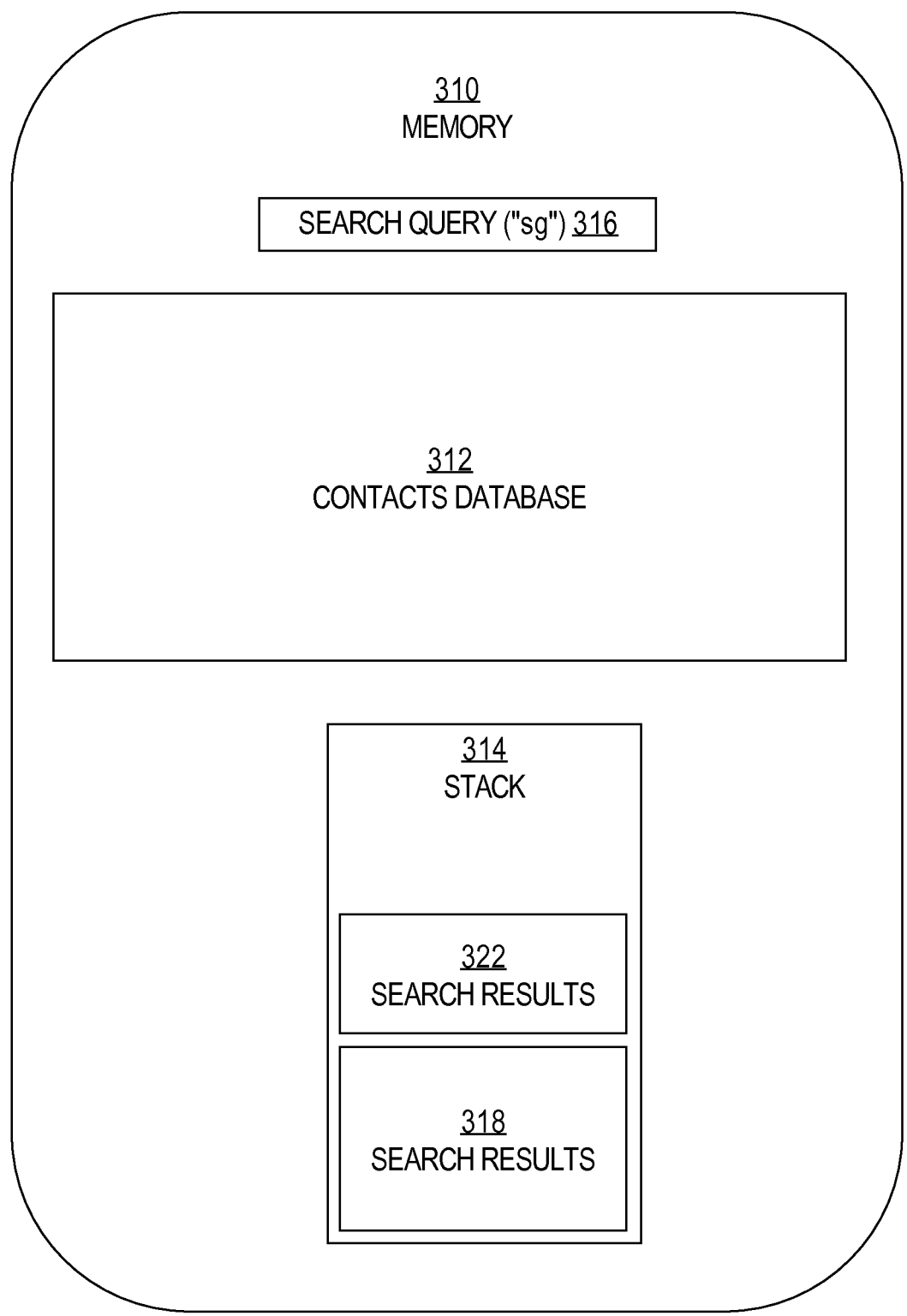

FIG. 3G indicates that search query 316 is now "sg." In response to receiving "sg" as the search query, the search component performs a search against the data items indicated by search results 318. In response to identifying data items in contacts database 312 (or in search results 318) that satisfy "sg," the search component creates search results 322 and pushes search results 322 onto stack 314, as depicted in FIG. 3G. The data items indicated by search results 322 are a subset of the data items indicated by search results 318.

Figure 3H:
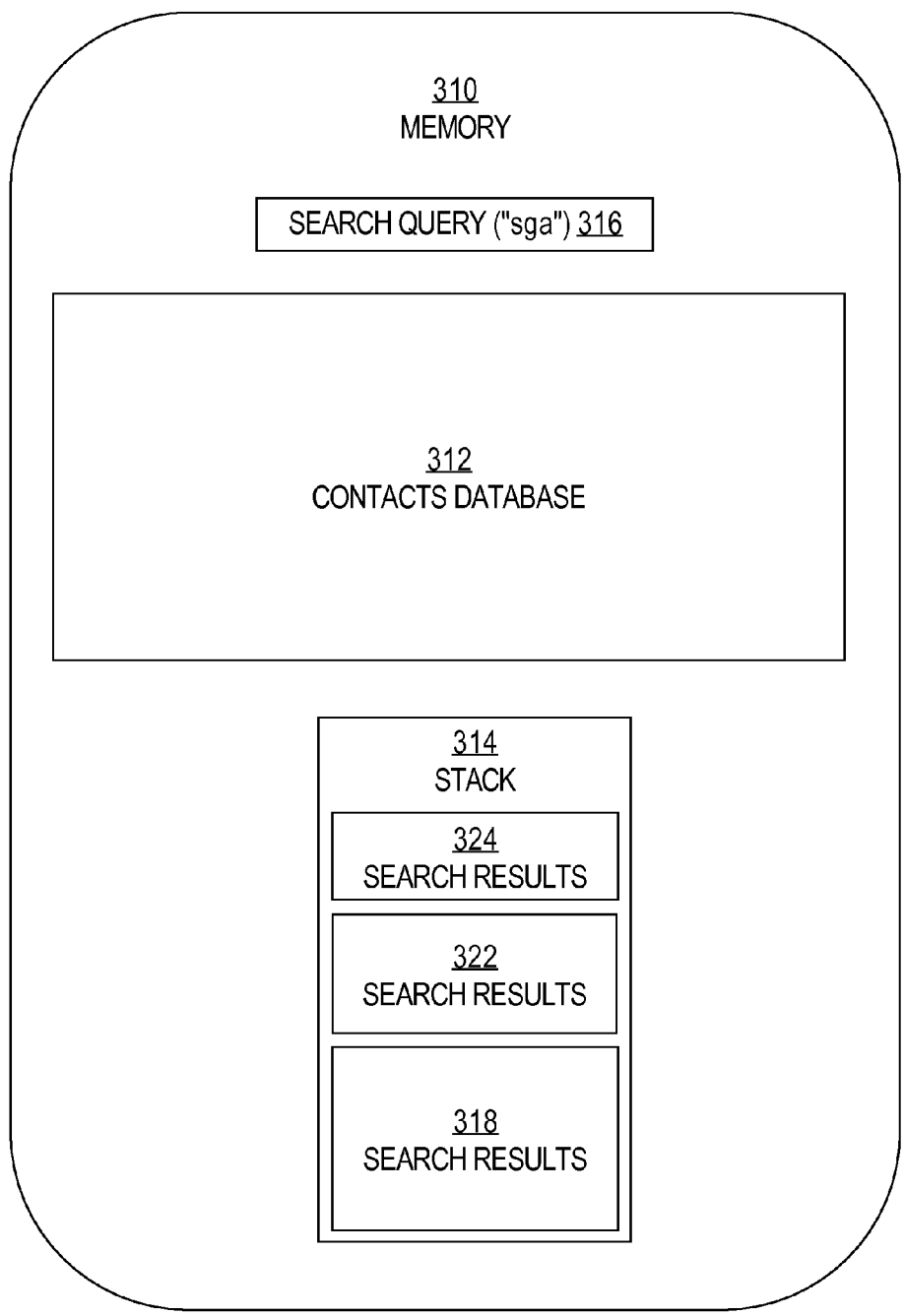

FIG. 3H indicates that search query 316 is now "sga." In response to receiving "sga" as the search query, the search component performs a search against the data items indicated by search results 322. In response to identifying data items in contacts database 312 (or in search results 322) that satisfy "sga," the search component creates search results 324 and pushes search results 324 onto stack 314, as depicted in FIG. 3H. The data items indicated by search results 324 are a subset of the data items indicated by search results 322.

Storing Copies V. Storing References

The foregoing description refers to pushing onto a stack either (a) references to data items or (b) copies of data items. Embodiments are not limited to an either-or approach. In an embodiment, in response to one or more searches, copies are pushed onto a stack while, in response to one or more other searches, references are pushed onto the stack. For example, search results 318 may include copies of data items while each of search results 320-324 includes references to data items instead of copies of data items. Those references may be to the copies in search results 318 or to data items in contacts database 312. As another example, search results 318 may include references to data items in contacts database 312 and search results 320 may include copies of data items that satisfy the search query that corresponds to search results 320.

One or more criteria may be used to determine whether to copy data items (or portions thereof) or to create and store references to the data items. One criterion may relate to the number of data items that satisfy a search query. For example, if the number of data items that satisfy the search query is over 75, then references will be created and pushed onto a stack.

Another criterion may relate to the amount of data that would need to be copied. For example, if the amount of data that would need to be copied is greater than 2 MB, then references will be created and pushed onto a stack.

Data Items Including Multiple Data Fields

As noted above, a contacts database is one example of a target source that is the subject of a series of searches. Also, a contacts database may include multiple data records, where each record is associated with a different contact and each record contains multiple fields, such as first name, last name, home address, business address, an array of email addresses, an array of phone numbers, etc. A calendar database is another example of a target source that is the subject of a series of searches. A calendar database may similarly include multiple date records, where each record is associated with a different calendar event and each record contains multiple fields, such as time, date, location, attendees, organizer, etc.

In an embodiment, a search component, in returning data that satisfies a search query, may return other data that is associated with the data that satisfies the search query. For example, a search query may be "sd" which matches one of the email addresses (e.g., "sdawg@yahoo.com") for contact Alan Smith. In this example, the search component identifies a contacts data record for Alan Smith and returns the matching email address along with the name "Alan Smith." In this way, a UI component may display "Alan Smith" concurrently with "sdawg@yahoo.com" in order to allow a user of a mobile device to see the name associated with the matching email address.

In an embodiment, a search component receives information that indicates the type of data that is being searched for and uses the type information to return the appropriate information. For example, the search component may determine that a user is searching for a phone number to select but may receive, as a search query, non-numeric characters that match one or more names in a contacts database. Based on the knowledge that the user is searching for a phone number, the search component, after identifying data records that satisfy the search query, identifies one or more phone numbers associated with each data record and causes the phone numbers to be displayed (e.g., through a UI component) and, optionally, names associated with the phone numbers. If it is known that the user is searching for email addresses, then the search component does not return phone numbers, but instead returns email addresses and, optionally, names associated with the email addresses.

In an embodiment, a search component uses a search query to restrict which fields of a data record to search. For example, if the search query is a series of numeric characters, then record fields that do not include numeric characters (such as first and last name fields) are not searched. Instead, fields that include numeric characters (such as phone number, address, and zip code) are searched.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
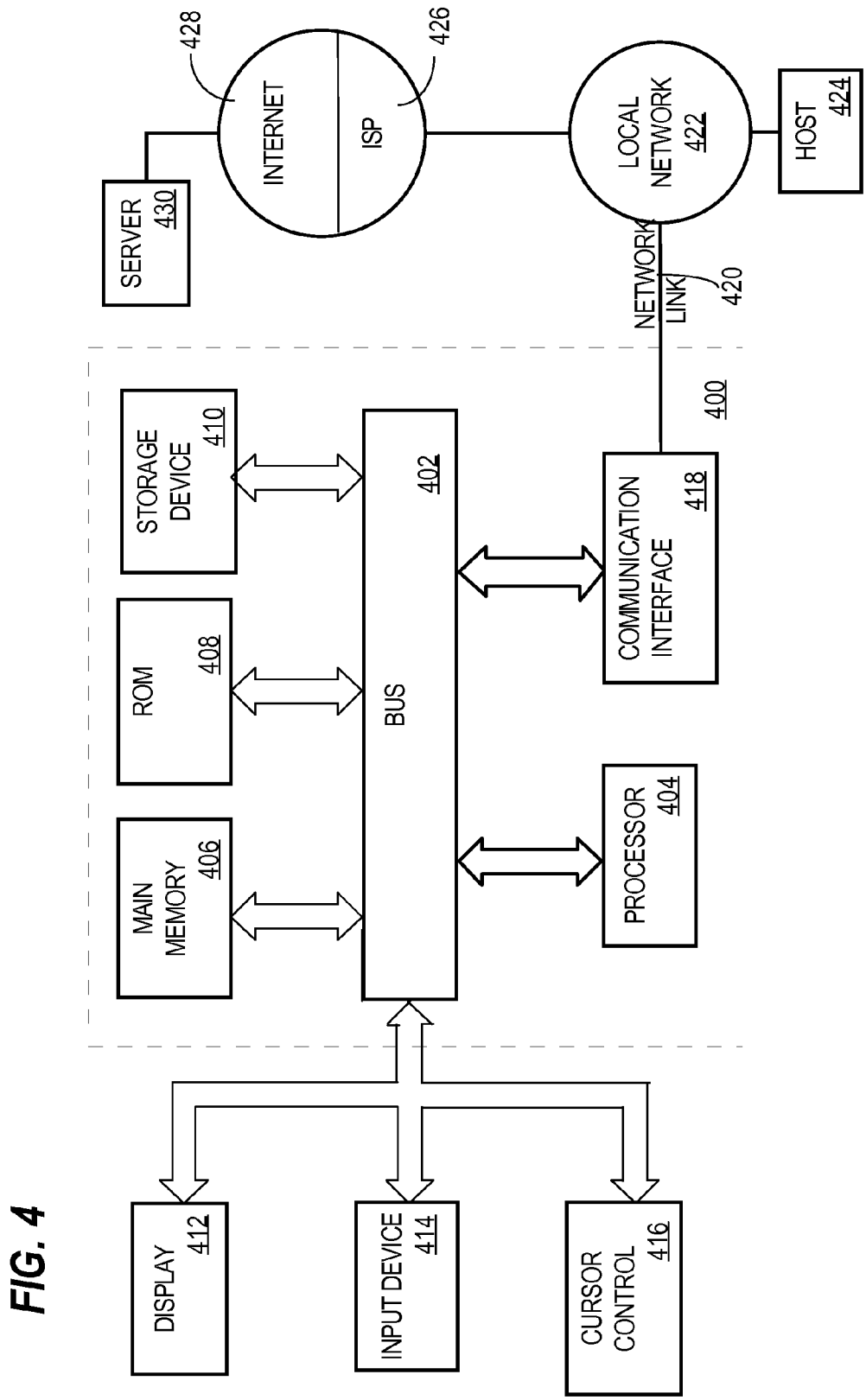
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
in response to receiving a first search query, determining search results from a data set, wherein the search results is a strict subset of the data set;
after determining the search results and in response to receiving a second search query that comprises the first search query and one or more additional characters, searching only the search results based on the second search query;
as a result of searching only the search results based on the second search query, identifying a first strict subset of the search results;
wherein each search result in the first strict subset satisfies the second search query; in response to identifying the first strict subset, storing a first set of references, wherein each reference in the first set of references refers to a different search result in the first strict subset of the search results;
wherein the number of references in the first set of references is the same as the number of search results in the first strict subset;
wherein the method is performed by one or more computing devices.

2. The method of claim 1, further comprising:
after storing the first set of references and in response to receiving a third search query, searching only the first strict subset based on the third search query;
wherein searching only the first strict subset comprises, for each reference in the first set of references:
using said each reference to identify a search result in the first strict subset,
determining whether the search result satisfies the third search query; as a result of searching only the first strict subset, identifying a strict subset of the first strict subset;
in response to identifying the strict subset of the first strict subset, storing a second set of references, wherein each reference in the second set of references refers to a different search result in the first strict subset;
wherein the number of references in the second set of references is the same as the number of search results in the strict subset of the first strict subset.

3. The method of claim 1, further comprising:
in response to determining the search results, causing a least a portion of the search results to be displayed;
in response to identifying the first strict subset, causing a least a portion of the first strict subset of the search results to be displayed.

4. A method comprising:
in response to receiving a first search query, determining search results from a data set, wherein the search results is a strict subset of the data set;

in response to determining the search results, storing a first set of references, wherein each reference in the first set of references refers to a different search result in the search results;

wherein the number of references in the first set of references is the same as the number of the search results;

after determining the search results and in response to receiving a second search query that comprises the first search query and one or more additional characters, searching only the search results based on the second search query;

as a result of searching only the search results based on the second search query, identifying a first strict subset of the search results;

wherein each search result in the first strict subset satisfies the second search query;

wherein the method is performed by one or more computing devices.

5. The method of claim 4, further comprising, in response to receiving the second search query:
for each reference in the first set of references:
using said each reference to identify a search result in the search results, and
determining whether the search result satisfies the second search query.

6. A method comprising:
in response to receiving a first search query, determining search results from a data set, wherein the search results is a strict subset of the data set;
after determining the search results and in response to receiving a second search query that comprises the first search query and one or more additional characters, searching only the search results based on the second search query;
as a result of searching only the search results based on the second search query, identifying a first strict subset of the search results;
wherein each search result in the first strict subset satisfies the second search query;
response to identifying the first strict subset, creating and storing a copy of each search result in the first strict subset;
in response to receiving a third search query, searching only the copy of each search result in the first strict subset based on the third search query;
as a result of searching only of the first stridt subset basec of the third search query, identifying a strict subset of the first strict subset;
wherein each search result in the strict subset of the first strict subset satisfies the third search query;
wherein the method is performed by one or more computing device.

7. A method comprising:
in response to receiving a first search query, determining search results from a data set, wherein the search results is a strict subset of the data set;
after determining the search results and in response to receiving a second search query, searching only the search results based on the second search query;
as a result of searching only the search results based on the second search query, identifying a first strict subset of the search results;
wherein each search result in the first strict subset satisfies the second search query;
in response to identifying the first strict subset:
creating and storing first result data that identifies the first strict subset:
inserting the first result data onto a stack;
after identifying the first strict subset and in response to receiving a third search query, searching only the first strict subset based on the third search query;
as a result of searching only the first strict subset based on the third search query, identifying a strict subset of the first strict subset;
wherein each search result in the strict subset of the first strict subset satisfies the third search query;
in response to identifying the strict subset of the first strict subset:
creating and storing second result data that identifies the strict subset of the first strict subset;
inserting the second result data onto the stack;
after inserting the second result data onto the stack and in response to receiving a fourth search query:
removing the second result data from the stack;
identifying the first result data in the stack;
using the first result data to identify the first strict subset;
wherein the method is performed by one or more computing devices.

8. The method of claim 7, wherein the third search query is a subset of the fourth search query and is shorter than the fourth search query.

9. One or more non-transitory storage media carrying instructions which, when executed by one or more processors, cause:
in response to receiving a first search query, determining search results from a data set, wherein the search results is a strict subset of the data set;
after determining the search results and in response to receiving a second search query that comprises the first query and one or more additional characters, searching only the search results based on the second search query;
as a result of searching only the search results based on the second search query, identifying a first strict subset of the search results;
wherein each search result in the first strict subset satisfies the second search query;
in response to identifying the first strict subset, storing a first set of references, wherein each reference in the first set of references refers to a different search result in the first strict subset of the search results;
wherein the number of references in the first set of references is the same as the number of search results in the first strict subset.

10. The one or more storage media of claim 9, wherein the instructions, when executed by the one or more processors, further cause:
after storing the first set of references and in response to receiving a third search query, searching only the first strict subset based on the third search query;
wherein searching only the first strict subset comprises, for each reference in the first set of references:
using said each reference to identify a search result in the first strict subset,
determining whether the search result satisfies the third search query; as a result of searching only the first strict subset, identifying a strict subset of the first strict subset;
in response to identifying the strict subset of the first strict subset, storing a second set of references, wherein each reference in the second set of references refers to a different search result in the first strict subset;
wherein the number of references in the second set of references is the same as the number of search results in the strict subset of the first strict subset.

11. The one or more storage media of claim 9, wherein the instructions, when executed by the one or more processors, further cause:
- in response to determining the search results, causing a least a portion of the search results to be displayed;
- in response to identifying the first strict subset, causing a least a portion of the first strict subset of the search results to be displayed.

12. One or more non-transitory storage media storing instructions which, when executed by one or more processors, cause:
- in response to receiving a first search query, determining search results from a data set, wherein the search results is a strict subset of the data set;
- in response to determining the search results, storing a first set of references, wherein each reference in the first set of references refers to a different search result in the search results;
- wherein the number of references in the first set of references is the same as the number of the search results;
- after determining the search results and in response to receiving a second search query that comprises the first search query and one or more additional characters, searching only the search results based on the second search query;
- as a result of searching only the search results based on the second search query, identifying a first strict subset of the search results;
- wherein each search result in the first strict subset satisfies the second search query.

13. The one or more storage media of claim 12, wherein the instructions, when executed by the one or more processors, further cause, in response to receiving the second search query:
- for each reference in the first set of references:
  - using said each reference to identify a search result in the search results, and
  - determining whether the search result satisfies the second search query.

14. One or more non-transitory storage media storing instructions which, when executed by one or more processors, cause:
- in response to receiving a first search query, determining search results from a data set, wherein the search results is a strict subset of the data set;
- after determining the search results and in response to receiving a second search query that comprises the first query and one or more additional characters, searching only the search results based on the second search query;
- as a result of searching only the search results based on the second search query, identifying a first strict subset of the search results;
- in response to identifying the first strict subset, creating and storing a copy of each search result in the first strict subset;
- in response to receiving a third search query, searching only the copy of each search result in the first strict subset based on the third search query;
- as a result of searching only the first strict subset based on the third search query, identifying a strict subset of the first strict subset;
- wherein each search result in the strict subset of the first strict subset satisfies the third search query.

15. One or more non-transitory storage media storing instructions which, when executed by one or more processors, cause: in response to receiving a first search query, determining search results from a data set, wherein the search results is a strict subset of the data set;
- after determining the search results and in response to receiving a second search query, searching only the search results based on the second search query;
- as a result of searching only the search results based on the second search query, identifying a first strict subset of the search results;
- wherein each search result in the first strict subset satisfies the second search query;
- in response to identifying the first strict subset:
  - creating and storing first result data that identifies the first strict subset:
  - inserting the first result data onto a stack;
- after identifying the first strict subset and in response to receiving a third search query, searching only the first strict subset based on the third search query;
- as a result of searching only the first strict subset based on the third search query, identifying a strict subset of the first strict subset;
- wherein each search result in the strict subset of the first strict subset satisfies the third search query;
- in response to identifying the strict subset of the first strict subset:
  - creating and storing second result data that identifies the strict subset of the first strict subset;
  - inserting the second result data onto the stack;
- after inserting the second result data onto the stack and in response to receiving a fourth search query:
  - removing the second result data from the stack;
  - identifying the first result data in the stack;
- using the first result data to identify the first strict subset.

16. The one or more storage media of claim 15, wherein the third search query is a subset of the fourth search query and is shorter than the fourth search query.

* * * * *

UNITED STATES PATENT AND TRADEMARK OFFICE
CERTIFICATE OF CORRECTION

PATENT NO.        : 8,965,909 B2
APPLICATION NO.   : 13/726449
DATED             : February 24, 2015
INVENTOR(S)       : Jon Herron It is certified that error appears in the above-identified patent and that said Letters Patent is hereby corrected as shown below:

In the Claims

COLUMN 13
Claim 6: Line 40: Delete "response to identifying" and insert --in response to identifying--.

Lines 46-47: Delete "first stridt subset basec of the third" and insert --first strict subset based on the third--.

Signed and Sealed this
Twelfth Day of May, 2015

Michelle K. Lee
*Director of the United States Patent and Trademark Office*